United States Patent [19]

Osborne

[11] 4,415,446
[45] Nov. 15, 1983

[54] AUTOMATIC CHEMICAL SOLUTION MIXING UNIT

[75] Inventor: James A. Osborne, Kingsport, Tenn.

[73] Assignee: Nalco Chemical Company, Oak Brook, Ill.

[21] Appl. No.: 345,689

[22] Filed: Feb. 4, 1982

[51] Int. Cl.$^3$ .............................................. C02B 1/18
[52] U.S. Cl. .................... 210/101; 210/110; 210/139; 210/205; 210/219
[58] Field of Search .................... 210/98, 101, 97, 104, 210/110, 138, 139, 205, 219, 193

[56] References Cited

U.S. PATENT DOCUMENTS

| | | | |
|---|---|---|---|
| 2,367,851 | 1/1945 | Eaton | 210/193 |
| 3,957,633 | 5/1976 | Gatti et al. | 210/104 |
| 4,094,786 | 6/1978 | Bury | 210/101 |
| 4,116,834 | 9/1978 | King | 210/101 |
| 4,160,727 | 7/1979 | Harris, Jr. | 210/97 |

Primary Examiner—John Adee
Attorney, Agent, or Firm—Kinzer, Plyer, Dorn & McEachran

[57] ABSTRACT

A low cost automatic system for making up a chemical solution for use in a water treatment facility includes a mixing tank having high and low liquid level switches disposed therein. A water supply line having a remotely-controlled solenoid valve supplies water to the mixing tank. A pressure regulator in the water supply line maintains the water pressure in the line between about 5 pounds per square inch and 125 pounds per square inch. Water treatment chemicals are stored in a supply tank and are fed by a metering pump to the mixing tank through a supply line. An electrical control circuit is responsive to the high and low liquid level switches in the tank. The control circuit operates the solenoid valve in the water supply line and the chemical pump as required to maintain a supply of chemical solution in the mixing tank.

5 Claims, 2 Drawing Figures

AUTOMATIC CHEMICAL SOLUTION MIXING UNIT

SUMMARY OF THE INVENTION

This invention relates to an automatic system for mixing chemical solutions. In particular it relates to a system for making up a chemical solution for use in industrial water treatment facilities.

A primary object of the present invention is a low cost system which can be adapted for use in existing water treatment facilities.

Another object is a system for making up a chemical solution which automatically maintains a supply of treatment chemical for use in the facility without requiring intervention by plant personnel.

Another object is an automatic chemical solution make up system which does not necessarily require availability of clean, fresh water within a certain pressure range.

Another object is an automatic chemical solution make up system which permits formulation of solutions with variable chemical concentrations.

Other objects will become apparent in the following specification, drawings and claims.

DESCRIPTION OF A PREFERRED EMBODIMENT

Many industrial processes require chemical treatment of water. Sometimes this is done to clean up water which has already been used in a process while other times the treatment is to prepare water for subsequent use in a process. For example, a chemical flocculant solution may be added to process effluents to remove solids therefrom or chemicals such as corrosion inhibitors and dispersants may be added to cooling tower water prior to use. Whatever the ultimate use of the chemical solution, it is often necessary to have a constant supply of the solution for use in the plant. This can be accomplished by preparing the solution in a mixing tank equipped with a discharge line connected to the desired process location. The chemicals, in the proper dosage, are mixed with water in the mixing tank in a batch process. Thus, once the tank is filled, it is drained either continuously or intermittently as required by the process until the tank is empty, at which time a new batch of solution is made up. In the past, preparation of the chemical solution has been performed manually by plant personnel. However, manual chemical make up requires diligent monitoring of the solution tank by the plant operators, and requires them to attend to solution make up when they could be performing other tasks. Further, if for some reason the operator cannot get to the mixing station in time to make up a new batch of solution, the plant could be operating without the solution. If this goes on for a long period of time it could lead to down time for the plant.

Automatic systems for mixing chemical solutions are available but prior systems have the disadvantage of being relatively expensive and demanding in terms of the utilities which must be made available in the plant to operate the system. Specifically, some systems require the availability of clean, fresh water maintained within certain pressure ranges and, in some cases, a special power supply. In addition to these problems, prior systems sometimes require more floor space than is available in some plants. Accordingly, the present invention is directed to a low cost, simple automatic system for preparing chemical solutions. The system is easy to install, operate and maintain and can be readily adapted for existing installations.

Figure 1:
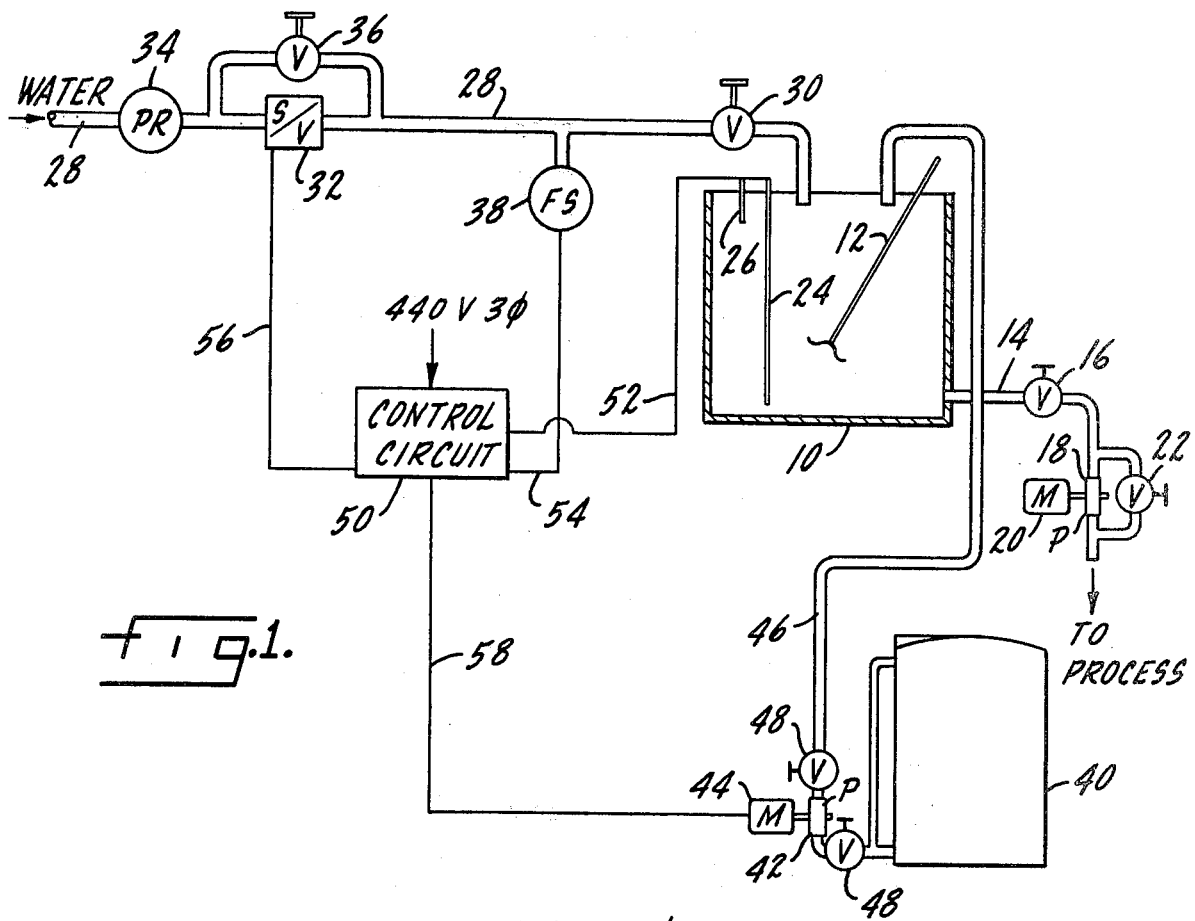
FIG. 1 is a schematic drawing of the automatic chemical solution mixing system of the present invention.

FIG. 1 shows the automatic chemical solution make up system of the present invention. The system includes a mixing tank 10 having a mixer or stirring rod 12. A drain or discharge line 14 carries the chemical solution from the tank 10 to the process as indicated by the arrow. The discharge line 14 may include a valve 16, a pump 18, a motor 20 for driving the pump and a by-pass valve 22, all as shown. The mixing tank 10 has liquid level switches or probes disposed therein. A low level probe 24 extends to a point adjacent the bottom of the tank and high level probe 26 extends to a point near the top of the tank.

Water is introduced into the mixing tank through a water supply line 28. A manual shutoff valve 30 provides independent control over the flow of water into the tank. The water flow is normally controlled by a solenoid valve 32. A pressure regulator 34 is provided ahead of the solenoid valve. The pressure regulator maintains the water pressure between about 5 pounds per square inch and 125 pounds per square inch. A standard solenoid valve is operable in this pressure range. A bypass valve 36 permits water flow independent of the solenoid valve 32. The water supply line 28 also includes a flow switch 38 which provides an electrical signal only when water is flowing through the supply line. The purpose of this will be explained below. The treatment chemicals are stored in a chemical supply tank 40. A metering pump 42, driven by a motor 44 supplies chemical from the tank 40 to the mixing tank 10 through a chemical supply line 46. Manual valves 48 are provided on either side of the pump 42.

The operation of the system is governed by a control circuit indicated schematically at 50. The control circuit is electrically connected to the liquid level probes 24 and 26 by an electrical line 52. Similarly, the control circuit is connected to the flow switch 38 by line 54 and to the solenoid valve 32 by line 56. The control circuit also provides 440 volt, 3-phase power to the pump motor 44 through line 58.

Figure 2:
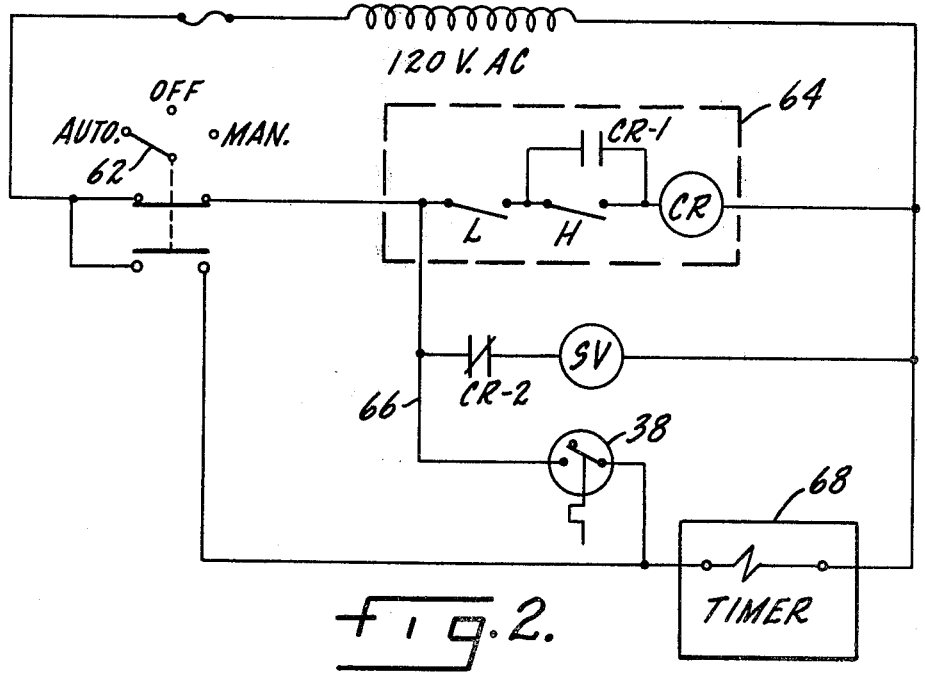
FIG. 2 is an electrical schematic showing the details of the control circuit.

The details of the control circuit 50 are shown in FIG. 2. The control circuit includes a step-down power transformer 60 which steps down from 440 volts to 120 volts. A selector switch 62 can be positioned for automatic or manual operation or for shutting the system off. The Figure shows the switch in the automatic position. In the automatic position power is supplied to a level control board 64. The control board contains normally open switches L and H whose condition corresponds to the low and high liquid level switches 24 and 26. These switches are normally open and close upon contact of the probes 24 and 26 with the chemical solution. Thus it can be seen that although switch L is normally open, most of the time there will be sufficient chemical solution in the tank to maintain contact with the low level probe 24 and therefore the switch L will be closed except when the tank is empty. Likewise, the switch H will most often be open and will close only when the tank is full. The switches L and H are connected in series with a control relay CR. Holding contacts CR-1 are provided around the high level switch H. The coil for the solenoid valve 32 is labeled SV. It is connected to contacts CR-2 which are controlled by the relay CR. The flow switch 38 is also connected to the level control board 64 through line 66 as shown. A timer 68 controls the supply of power to the motor 44 which drives the chemical metering pump 42. Once the timer is activated it supplies power for a period of time necessary to supply the desired chemical dosage. After a preset time, the timer times out and power to the pump motor is shut off. The operation of the control circuit is as follows.

When the liquid level in the mixing tank 10 drops below the low level probe 24, the low level switch L opens which cuts off power to the control relay CR. This in turn opens contacts CR-1 and closes contacts CR-2. The latter action provides power through line 66 to the coil SV of the solenoid valve 32. This opens the solenoid valve and starts the water flow through supply line 28 into the mixing tank 10. Once the water is flowing the flow switch 38 closes which provides power to the timer 68. The timer then closes contacts (not shown) in the power supply line to the pump motor 44. This starts the metering pump which supplies treatment chemicals from the tank 40 to the mixing tank 10. After a preset time, the timer 68 times out and the power to the pump motor is shut off. The timer is adjustable so that variable pump operation times can be set to permit the selection of a desired chemical dosage.

As the tank fills, the liquid level first reaches the low level probe 24 which closes the switch L. Since both the switch H and contacts CR-1 are open at this point, the closing of switch L has no immediate effect on the circuit. When the liquid level reaches the high level probe 26 the switch H closes, thereby completing the circuit to the control relay CR. This causes the closing of contacts CR-1 and the opening of contacts CR-2. Contacts CR-1 provide a holding circuit around the high level switch H. The opening of contacts CR-2 cuts off power to the solenoid coil SV, thereby closing the solenoid valve 32 and shutting off the water supply. At this time the timer will have already timed out so the chemical pump will also have been shut off. Thus the filling cycle of the tank is concluded. The mixing tank is then drained through the discharge line 14 according to the demands of the process. When the liquid level drops below the high level probe 26 the high level switch H will open but this has no immediate effect on the circuit as power to the control relay CR is maintained through the holding contacts CR-1. Contacts CR-2 remain open and the water supply remains shut off by the solenoid valve 32. When the liquid level drops below the low level probe the switch L opens and, as described above, the filling sequence restarts. While the circuit shown is sufficient to cause the desired operation, it will be understood that other, equivalent circuit designs could be used.

I claim:

1. In a water treatment facility, an automatic system for making up a chemical solution for use in the facility, comprising:
    a mixing tank having high and low liquid level switches disposed therein;
    a water supply line for supplying water to the mixing tank, the line including a remotely-controlled solenoid valve for controlling the flow of water to the mixing tank;
    a pressure regulator in the water supply line which maintains the water pressure between about 5 pounds per square inch and 125 pounds per square inch;
    a chemical supply tank and a line for supplying treatment chemical directly to the mixing tank; and
    an electrical control circuit responsive to the level switches in the mixing tank to operate the solenoid valve and the pump when needed so that the input of water and treatment chemical to the mixing tank is responsive to the liquid level in the mixing tank and a supply of chemical solution in the mixing tank is maintained.

2. The system of claim 1 further comprising a water flow switch in the water supply line, the switch governing operation of the pump so that chemical can be pumped into the mixing tank only when water is also flowing into the tank.

3. The system of claim 1 further comprising a mixing rod in the mixing tank.

4. The system of claim 1 wherein the control circuit includes a timer which governs operation of the pump.

5. The system of claim 4 wherein the timer is adjustable so that the pump will run for variable times, as required to obtain the desired chemical dosage.

* * * * *